Figure 1:
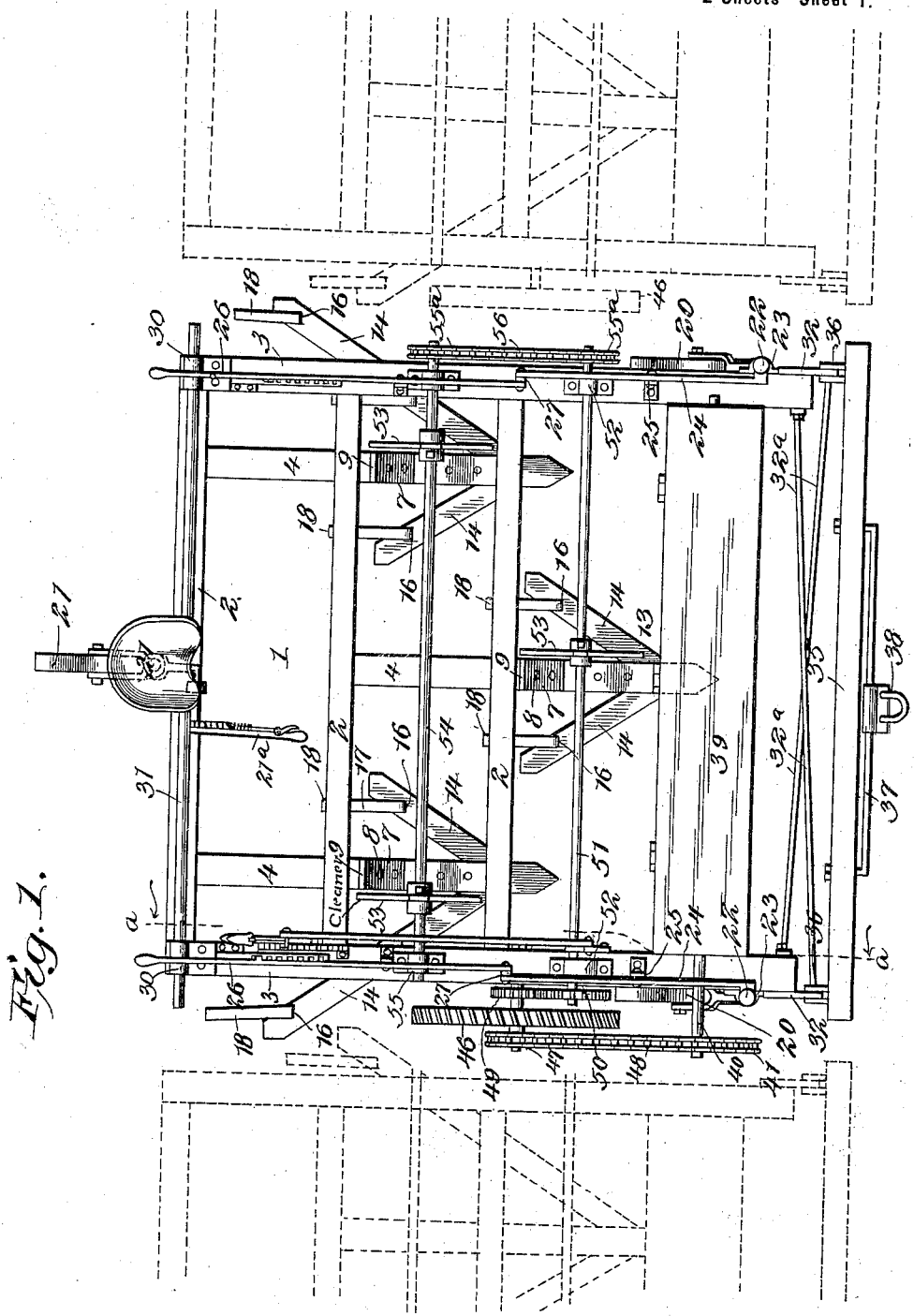

No. 662,665. Patented Nov. 27, 1900.
G. L. BRADLEY.
CULTIVATOR.
(Application filed June 30, 1900.)
(No Model.) 2 Sheets—Sheet 1.

Witnesses
Howard D. Orr
J. W. Garner

George L. Bradley, Inventor.
by C. A. Snow & Co.
Attorneys

No. 662,665. Patented Nov. 27, 1900.
G. L. BRADLEY.
CULTIVATOR.
(Application filed June 30, 1900.)
(No Model.) 2 Sheets—Sheet 2.
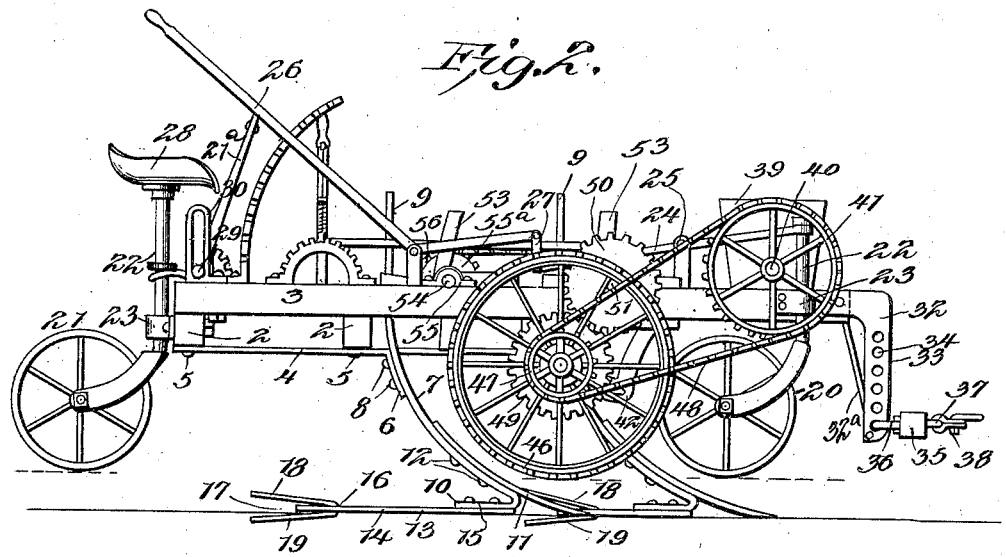
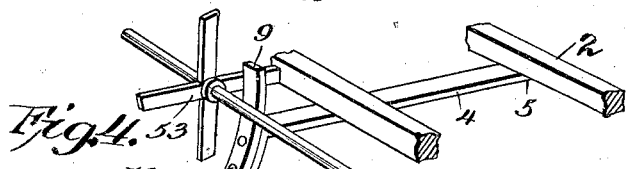
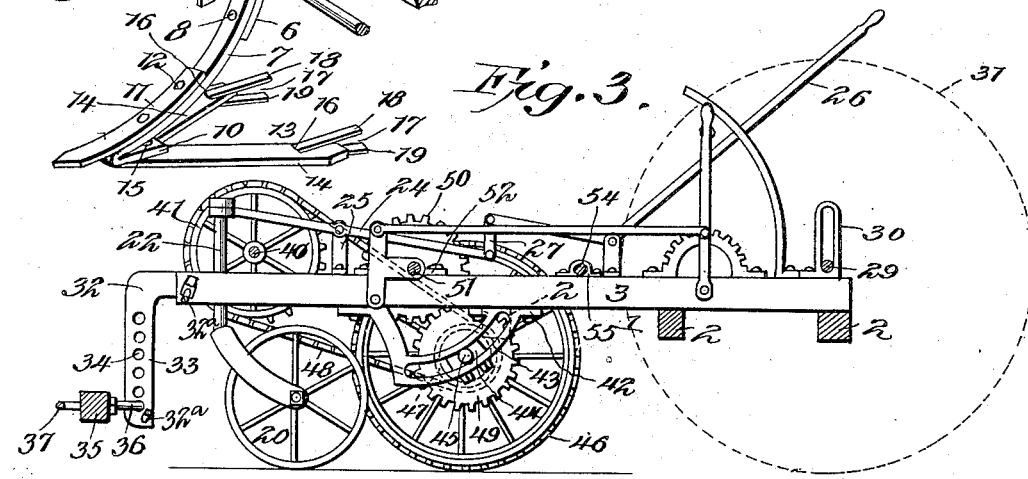
Witnesses
Howard D. Orr
J. W. Garner
George L. Bradley, Inventor,
by C. A. Snow & Co.
Attorneys

UNITED STATES PATENT OFFICE.

GEORGE LOWTHER BRADLEY, OF PATAHA CITY, WASHINGTON.

CULTIVATOR.

SPECIFICATION forming part of Letters Patent No. 662,665, dated November 27, 1900.

Application filed June 30, 1900. Serial No. 22,214. (No model.)

*To all whom it may concern:*

Be it known that I, GEORGE LOWTHER BRADLEY, a citizen of the United States, residing at Pataha City, in the county of Garfield and State of Washington, have invented a new and useful Cultivator, of which the following is a specification.

My invention is an improved cultivator especially adapted for operating in fallow ground to clear the same of weeds and put it in condition for planting; and it consists in the peculiar construction and combination of devices hereinafter fully set forth, and pointed out in the claims.

In the accompanying drawings, Figure 1 is a top plan view of a cultivator embodying my improvements, showing the same provided with broadcast-seeder attachment. Fig. 2 is a side elevation of the same. Fig. 3 is a sectional view taken on the line $a\ a$ of Fig. 1. Fig. 4 is a detail perspective view of one of the cultivators.

In the embodiment of my invention I provide a frame 1, which is preferably rectangular in shape and is provided with a series of two or more transversely-disposed bars 2, which connect the side bars 3. A series of cultivators for operating in the soil are attached to frame 1, and I will now describe one of the said cultivators, the same being shown in detail in Fig. 4 and in connection with the frame 1 in Figs. 1 and 2.

The beam 4 is disposed longitudinally and adapted to be bolted under certain of the cross-bars 2, as at 5. The front end of the beam is provided with a downturned curved arm 6. The standard 7 is curved as shown and comprises a flat bar. The same is bolted on the front side of the arm 6, as at 8, at a point about intermediate of its height, whereby an extension 9 is formed at the upper end of the standard above the beam 4. The lower end of the standard is turned rearwardly on a horizontal line to form an arm 10. A point 11, which corresponds in shape with the standard 7, is secured on the front side thereof by means of bolts, as at 12, the said point projecting in advance of the bottom of the standard. A V-shaped cutter 13, having the obliquely-disposed wings or arms 14, is bolted at its apex to the under side of the arm 10, as at 15. The said cutter has its front edges suitably sharpened and is flat and adapted to operate under the surface of the soil at the depth of a few inches and to destroy weeds by cutting off the same below the surface of the soil. Each of the arms or wings 14 is provided near its rear end with an opening 16, the said openings being disposed in line with each other, and in the same are fitted surface-breakers 17, each of which is a flat steel bar of suitable length bent substantially in the form of a triangle and secured at its apex in one of the openings 16, the upper arm 18 thereof projecting above the surface of the soil at its rear end and the lower arm 19 being disposed in a horizontal plane under the arm or wing 14, to which it is attached. It will be understood that the points 11 and the soil-breakers 17 by breaking the surface of the soil will throw furrows which will cause the weeds cut by the arms or wings of the cultivators to be brought to the surface and exterminated. The arm 9, which forms a vertical extension of the upper end of the standard 7, by projecting above the beam 4 prevents the weeds from clogging the cultivator. In connection with each of the cultivators I propose under certain conditions to employ a revolving cutter, which coacts with one side of the standard 7 to cut such weeds as lodge against the face of the standard and prevent them from clogging the same. As shown in Fig. 1 of the drawings, the cultivators 13 are so disposed under the frame 1 and with relation to each other that the arms or wings of the respective cultivators overlap, so that the soil is thoroughly stirred and cleared of the weeds growing therein.

The frame 1 should be provided with means to support the same when in operation, so that the cultivators may be caused to operate at the required depth below the surface of the soil. In the drawings I have shown caster-wheels 20, which support the front corners of the frame, and a caster-wheel 21, which supports the rear side of the frame and is disposed in the center thereof. The frames of the caster-wheels are provided with vertical shaft-arms 22, which operate in bearings 23, bolted to the frame 1, and said frames are adjustable vertically by any suitable means. Levers 24, which are mounted on standards 25 on the sides of frame 1, have their front ends forked and engage the vertical arms 22 of the frames of caster-wheels 20. Said levers are operated by hand-levers 26, which are connected thereto by links 27, and hence the caster-wheels at the front end of the frame 1 may be raised or lowered to adjust said frame as may be required. A suitable lever, as at 21$^a$, is employed to vertically adjust the caster-wheel 21 at the rear side of the frame. When the cultivator is to be driven by an operator stationed thereon, I provide a seat 28 for the driver which is mounted on the upper end of the vertically-extending arm 22 of the frame of the rear caster-wheel 21. When the cultivator is to be employed on hilly and uneven ground, the caster-wheel 21 is detached from the frame and a shaft 29, which is movable in vertical bearings 30 and provided at its end with supporting-wheels 31, (indicated in dotted lines in Fig. 1,) is employed in lieu of the caster-wheel 21.

Clevises 32 are bolted to the sides of the frame 1 at the front corners thereof and have depending vertical arms 33, provided with a series of openings 34. The hitch-bar 35 is provided at its ends with rearward-extending links or hooks 36 to attach the same to the depending arms of the clevises by engagement with appropriate openings 34. A slide-bar 37 is disposed on the front side of the hitch-bar and on the same is a sliding eyepiece adapted for the attachment of the doubletree to which the team is harnessed in the usual manner. It will be understood from the foregoing and by reference to Fig. 2 of the drawings that the hitch-bar may be lowered as may be required to dispose the same directly in the line of draft, and thereby lighten the labor of the team as much as is possible.

The frame 1 may be of any suitable size and provided with any suitable number of the cultivators.

Where my improved cultivator is to be used on large areas, it is desirable to employ a number of sections thereof in conjunction, disposed side by side, as indicated in Fig. 1 of the drawings.

My improved cultivator is also adapted to operate in conjuction with seeding mechanism whereby the operations of preparing the soil and seeding the same may be performed simultaneously. In Figs. 1 and 2 of the drawings I have shown broadcast-seeding apparatus in connection with my cultivator, which I will now describe. The seeding apparatus may be of any of the well-known forms and constitutes in itself no part of my present improvement. The hopper or seedbox 39 is disposed transversely on the front side of frame 1, and the shaft 40 of the seed mechanism is provided at one end with a sprocket-wheel 41. A curved standard 42, which has a curved guideway 43, is bolted to the under side of frame 1 on one side thereof, and in the said guideway is an adjustable bearing-block 44, in which the shaft 45 of a traction-wheel 46 is journaled. A sprocket-wheel 47, which rotates with the traction-wheel, is secured on the shaft 45 and connected to the sprocket-wheel 41 by an endless sprocket-chain 48. A spur-wheel 49 also rotates with the traction-wheel and engages the spur-wheel 50 on a shaft 51, which is journaled in suitable bearings 52 on the sides of frame 1. The said shaft 51 is provided with a suitable number of revolving cutters 53 to operate in connection with the standards of the cultivators for the purpose of cutting the stalks of such weeds as fall upon the standard, as hereinbefore described. A similar shaft 54 is disposed in rear of shaft 51 and mounted in bearings 55 and provided with a suitable number of revolving cutters to operate in connection with the standards of the cultivators disposed toward the rear of frame 1. As many of the shafts 54 will be employed as is required by the size of frame 1. The shafts 51 54 are connected operatively by sprocket-wheels 55 and an endless sprocket-chain 56, whereby power is communicated from shaft 51 to the shaft 54. The curved standard 42 adapts the traction-wheel 46 to be adjusted vertically to correspond with the adjustment of the frame 1. It will be understood that by means of the vertically-adjustable caster-wheels which serve to support the frame 1 the latter may be raised to such an extent as to entirely withdraw the cultivators 13 from the soil and support the same above the ground when the machine is driven from one point to another.

A suitable drilling mechanism may be employed in lieu of the broadcast seeder hereinbefore referred to if it be desirable to sow the seeds in drills.

By so constructing and arranging the means for rotating the revolving cutters 53 as to reverse the direction of the rotation thereof the said cutters serve to push the weeds across the front of the standards, so that they pass under the frame and have their roots cut and brought to the surface by the cutters 13 and surface-breakers 17 and exposed to the sun, which in drying the roots effectually kills the weeds, as will be understood.

The standard 7 may be provided with suitable braces, if the same are required. The cutters 13 may be each formed either of a single piece or two pieces bolted or otherwise secured together to form the apex of the triangle. The sliding eyepiece 38 is provided with suitable means, whereby it may be secured at any adjustment required. The vertical arms 33 of the clevises 32 are braced by suitable crossed bars or chains 32$^a$, which strengthen the said arms and adapt the same to withstand side draft when the machine is turned.

Having thus described my invention, I claim—

1. A cultivator comprising a standard having a point the horizontally-disposed rearward-diverging cutting wings or arms at the base of the standard, and the surface-breakers projecting upward from said cutting wings or arms, substantially as described.

2. A cultivator comprising a beam, a standard having a point and the horizontally-disposed rearward-diverging wings or arms at the base of the standard, the latter having a vertical extension projecting above the beam to which it is attached to prevent weeds from clogging the cultivator, substantially as described.

3. The combination of a frame and supporting-wheels therefor, a series of cultivators each comprising a standard having a point and a pair of rearward-diverging cutting arms or wings at the base of the standard for the purpose set forth, shafts, means to rotate the same, and revoluble cutters coacting with the standards of the cultivators and carried by said shafts, substantially as described.

4. A cultivator having wings or arms adapted to operate under the surface of the soil, in combination with surface-breakers comprising arms 18, 19, arranged at an angle to each other and secured in openings in said cutting-wings, substantially as described.

In testimony that I claim the foregoing as my own I have hereto affixed my signature in the presence of two witnesses.

GEORGE LOWTHER BRADLEY.

Witnesses:
 GEO. STALLCUP,
 FRITZ REIMERS.